(12) United States Patent
Yoshizaki et al.

(10) Patent No.: US 8,903,624 B2
(45) Date of Patent: Dec. 2, 2014

(54) INTERNAL COMBUSTION ENGINE CONTROL APPARATUS

(75) Inventors: Satoshi Yoshizaki, Gotemba (JP); Shuntaro Okazaki, Sunto-gun (JP); Masashi Shibayama, Sunto-gun (JP); Kaoru Shokatsu, Susono (JP); Hajime Kawakami, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/997,810

(22) PCT Filed: Feb. 24, 2011

(86) PCT No.: PCT/JP2011/054140
§ 371 (c)(1),
(2), (4) Date: Jun. 25, 2013

(87) PCT Pub. No.: WO2012/114495
PCT Pub. Date: Aug. 30, 2012

(65) Prior Publication Data
US 2014/0041628 A1 Feb. 13, 2014

(51) Int. Cl.
*F02D 9/00* (2006.01)
*F02D 41/00* (2006.01)
*F02D 11/10* (2006.01)
*F02D 37/02* (2006.01)
*F02D 43/00* (2006.01)

(52) U.S. Cl.
CPC ........ *F02D 41/00* (2013.01); *F02D 2200/0625* (2013.01); *F02D 43/00* (2013.01); *F02D 11/105* (2013.01); *F02D 37/02* (2013.01); *F02D 41/0002* (2013.01); *F02D 2250/18* (2013.01); *F02D 2250/21* (2013.01); *Y02T 10/42* (2013.01)
USPC ........................................................ 701/102

(58) Field of Classification Search
CPC .................. F02D 2200/10; F02D 2200/0625; F02D 2200/08; F02D 43/00
USPC ........................................... 701/102, 103, 104
See application file for complete search history.

(56) References Cited

U.S. PATENT DOCUMENTS 6,584,952 B1 * 7/2003 Lagier ........................... 123/295
6,778,883 B1 8/2004 Gerhardt et al.
(Continued)

FOREIGN PATENT DOCUMENTS

| JP | A-11-141388 | 5/1999 |
| JP | A-2003-517138 | 5/2003 |

(Continued)

*Primary Examiner* — Thomas Moulis
(74) *Attorney, Agent, or Firm* — Oliff PLC

(57) ABSTRACT

When a change amount of any one of a demanded torque, a demanded efficiency, and a demanded air-fuel ratio exceeds a predetermined threshold value, an internal combustion engine control apparatus provided by this invention makes a temporary adjustment to a value of any one of a demanded torque, a demanded efficiency and instructed efficiency, and a demanded air-fuel ratio in accordance with a type of demanded engine performance that is currently being given priority among various performances demanded of the internal combustion engine. In the present control apparatus, an actuator for air amount control is operated in accordance with a target air amount calculated based on a demanded torque and a demanded efficiency, an actuator for ignition timing control is operated in accordance with an instructed efficiency, and an actuator for fuel injection amount control is operated in accordance with a demanded air-fuel ratio.

4 Claims, 4 Drawing Sheets

(56) References Cited

U.S. PATENT DOCUMENTS

| | | | |
|---|---|---|---|
| 8,068,944 B2* | 11/2011 | Tanaka | 701/4 |
| 8,204,639 B2* | 6/2012 | Jinno et al. | 701/22 |
| 8,209,106 B2* | 6/2012 | Ohtsuka et al. | 701/103 |
| 8,332,122 B2* | 12/2012 | Tanaka et al. | 701/101 |
| 8,725,393 B2* | 5/2014 | Tsuzuki et al. | 701/114 |
| 2007/0142987 A1* | 6/2007 | Takamatsu et al. | 701/41 |
| 2010/0191406 A1 | 7/2010 | Tanaka et al. | |
| 2010/0198485 A1 | 8/2010 | Ohtsuka et al. | |
| 2010/0211287 A1* | 8/2010 | Ohtsuka et al. | 701/102 |
| 2010/0324749 A1* | 12/2010 | Iwamoto et al. | 700/299 |
| 2011/0144885 A1* | 6/2011 | Ohtsuka et al. | 701/102 |

FOREIGN PATENT DOCUMENTS

| | | |
|---|---|---|
| JP | A-2009-47101 | 3/2009 |
| JP | A-2009-47102 | 3/2009 |
| JP | A-2009-299667 | 12/2009 |
| JP | A-2010-249018 | 11/2010 |

* cited by examiner

INTERNAL COMBUSTION ENGINE CONTROL APPARATUS

TECHNICAL FIELD

The present invention relates to an internal combustion engine control apparatus whose operations are controlled by a plurality of kinds of actuators.

BACKGROUND ART

As one of the methods for controlling an internal combustion engine, for example, as disclosed in Japanese Patent Laid-Open No. 2009-047102, a method is known that determines a manipulated variable of each actuator by using efficiency and an air-fuel ratio as well as torque as controlled variables. As used herein, the term "efficiency" refers to a ratio of torque that is actually outputted with respect to a potential torque that the internal combustion engine can output. Further, as used herein, the term "air-fuel ratio" refers to an air-fuel ratio of an air-fuel mixture provided for combustion in the internal combustion engine. There are demands from a variety of viewpoints with respect to the torque, the efficiency, and the air-fuel ratio as controlled variables. In the case of torque, there is torque that is demanded to satisfy an acceleration demand of a driver, and torque that is demanded for driving control, such as skid prevention and the like. In the case of efficiency, there is efficiency that is demanded for warming up a catalyst, and efficiency that is demanded for ensuring reserve torque and the like. In the case of the air-fuel ratio, there is an air-fuel ratio that is demanded in order to restore the NOx reducing ability of a catalyst quickly at the time of reversion from a fuel cut, and an air-fuel ratio that is demanded in order to improve purification performance of a catalyst during operation of the internal combustion engine and the like. According to the control apparatus (hereunder, referred to as "preceding apparatus") that is described in the aforementioned patent publication, in a case where there are a plurality of demands with respect to a single controlled variable in this manner, the final demanded controlled variable is determined by mediation. As used herein, the term "mediation" refers to a computation process for obtaining a single numerical value from a plurality of numerical values that is performed in accordance with a predetermined rule. As examples of the specific computation rule, selecting the value selection, selecting the minimum value, averaging, or superimposing may be mentioned.

Realization of the final demanded controlled variables obtained by mediation, that is, a demanded torque, a demanded efficiency, and a demanded air-fuel ratio, means realization of various kinds of performance (demanded engine performance) that are demanded of the internal combustion engine, namely, running performance, exhaust gas performance, and fuel consumption performance. According to the preceding apparatus, air amount control, ignition timing control, and fuel injection amount control are executed based on the aforementioned three kinds of demanded controlled variables. In the air amount control, a slot operation is performed in accordance with a target air amount that is calculated based on the demanded torque and demanded efficiency. In the ignition timing control, an operation of an ignition apparatus is performed in accordance with a ratio of a demanded torque with respect to an estimated torque (estimated potential torque) that is calculated based on a degree of throttle opening. Further, in the fuel injection amount control, an operation of a fuel injection apparatus is performed in accordance with a demanded air-fuel ratio. That is, according to the preceding apparatus, an attempt is made to realize each demanded controlled variable by causing three kinds of actuators to co-operate based on three kinds of demanded controlled variables.

However, depending on the rate of change in the demanded controlled variables, it is not necessarily the case that an effect that realizes a demanded engine performance that is the aim of the preceding apparatus can always be achieved. This is because when an operation of an actuator is related to a certain controlled variable, a limit that depends on the kind of the actuator exists with respect to a response speed of the relevant controlled variable to the operation of the actuator. For example, in the case of a throttle, the response speed of an air amount when the throttle is moved at a maximum speed is a limit response speed of the torque with respect to an operation of the throttle. In the preceding apparatus, the throttle is used as the principal actuator for controlling torque, and in a case where a change in any demanded controlled variable is faster than the limit response speed of the torque with respect to an operation of the throttle, a fluctuation in the torque that accompanies that change can not be suppressed by torque control that is performed by means of the throttle. In this respect, if ignition timing control or fuel injection amount control can cause the torque to change more quickly, the aforementioned kind of fluctuation in the torque can be suppressed and the demanded torque can be realized. However, in this case, it is no longer possible to realize, at least temporarily, one of the demanded controlled variables other than the demanded torque, that is, one of the demanded efficiency and the demanded air-fuel ratio. Thus, in this case, it is not possible to realize the demanded engine performance that relates to the demanded efficiency or the demanded air-fuel ratio that can not be realized among the various performances that are demanded of the internal combustion engine.

As described in the foregoing, running performance, exhaust gas performance, and fuel consumption performance are representative of the kinds of performances demanded of an internal combustion engine. However, there is an order of priority between these kinds of performances that depends on the state of the internal combustion engine or the circumstances in which the internal combustion engine is placed. For example, although exhaust gas performance is given priority at startup of the internal combustion engine, running performance is given priority when driving control such as skid prevention is performed. Even if it is not possible to realize all of the demanded engine performances, it is desirable to enable realization of at least the demanded engine performance that has the highest priority. However, according to the above described preceding apparatus, if any demanded controlled variable changes at a fast rate that exceeds a response speed of the relevant controlled variable with respect to an operation of an actuator, even if a demanded engine performance has the highest priority, realization thereof has not been ensured.

CITATION LIST

Patent Literature

Patent Literature 1:
    Japanese Unexamined Patent Publication No. 2009-299667
Patent Literature 2:
    Japanese Unexamined Patent Publication No. 2009-047101

Patent Literature 3:
  Japanese translation of PCT International Application Publication No. JP-T-2003-517138
Patent Literature 4:
  Japanese Unexamined Patent Publication No. 11-141388

SUMMARY OF INVENTION

The present invention has been conceived in view of the above described problems, and an object of the present invention is to provide a control apparatus that, even when any one of a demanded torque, a demanded efficiency, and a demanded air-fuel ratio that are demanded values of controlled variables changes at a fast rate that exceeds a response speed of the related controlled variable with respect to an operation of an actuator, can ensure realization of at least a performance that is demanded with highest priority among performances demanded of an internal combustion engine.

An internal combustion engine control apparatus that is provided by the present invention decides a demanded value of a controlled variable based on a performance that is demanded of the internal combustion engine (hereunder, referred to as "demanded engine performance"). The present control apparatus uses three kinds of controlled variables, namely, a torque that the internal combustion engine generates, an efficiency that is a ratio of a torque that is actually output with respect to a torque that the internal combustion engine can potentially output, and an air-fuel ratio of an air-fuel mixture that is provided for combustion in the internal combustion engine. The present control apparatus performs air amount control, ignition timing control, and injection amount control based on these three kinds of demanded controlled variables. In the air amount control, an actuator for air amount control is operated in accordance with a target air amount. The target air amount is an air amount for realizing a demanded potential torque at a demanded air-fuel ratio, and is calculated based on data in which a relationship between an air amount at an optimal ignition timing and a torque is defined in association with an air-fuel ratio. The demanded potential torque is calculated by dividing the demanded torque by the demanded efficiency. In the ignition timing control, an actuator for ignition timing control is operated in accordance with an instructed efficiency. A ratio of the demanded torque with respect to the estimated potential torque is calculated as the instructed efficiency. The estimated potential torque is a potential torque that is realized when an actuator for air amount control is operated in accordance with a target air amount at the demanded air-fuel ratio. In the fuel injection amount control, an actuator for fuel injection amount control is operated in accordance with the demanded air-fuel ratio.

Thus, the present control apparatus performs air amount control, ignition timing control, and fuel injection amount control based on a demanded torque, a demanded efficiency and a demanded air-fuel ratio that are decided on the basis of a demanded engine performance. However, when a change amount of any one of the demanded torque, the demanded efficiency, and the demanded air-fuel ratio exceeds a predetermined threshold value, the present control apparatus makes a temporary adjustment to a value of any one of the demanded torque, the demanded efficiency and the instructed efficiency, and the demanded air-fuel ratio. Preferably, the threshold value that serves as the criterion for that decision is set for each demanded controlled variable, respectively, on the basis of a response speed of the relevant controlled variable with respect to an operation of an actuator to which the demanded controlled variable is most related. The present control apparatus selects an object that an adjustment should be made to in accordance with a type of the demanded engine performance that is currently being given priority among various kinds of demanded engine performance.

For example, when the types of demanded engine performance that are currently being given priority are exhaust gas performance and fuel consumption performance, a temporary adjustment may be made to a value of the demanded efficiency and the instructed efficiency. Specifically, if a demanded controlled variable in which a change that exceeds a predetermined threshold value has occurred is the demanded air-fuel ratio, the demanded efficiency and the instructed efficiency may be fixed to a value of 1, respectively. In this case, although a temporary fluctuation arises in the torque, since a value that has been demanded is realized with respect to the efficiency and the air-fuel ratio, realization of both the exhaust gas performance, with which the air-fuel ratio is associated, and the fuel consumption performance, with which the efficiency is associated, are ensured.

A configuration may also be adopted that makes a temporary adjustment to the value of the demanded torque in addition to the demanded efficiency and the instructed efficiency. Specifically, when a change amount of the demanded air-fuel ratio exceeds a predetermined threshold value, the demanded efficiency and the instructed efficiency may be fixed to a value of 1, respectively, and a change in torque that arises accompanying a change in the demanded air-fuel ratio may be predicted and the predicted change in torque may be caused to be generated in the demanded torque. In this case also, although a temporary fluctuation arises in the torque, since a value that has been demanded is realized with respect to the efficiency and the air-fuel ratio, realization of both the exhaust gas performance, with which the air-fuel ratio is associated, and the fuel consumption performance, with which the efficiency is associated, are ensured. Further, in this case, since it is possible to lengthen a convergence period of a target air amount and lessen the rate of fluctuation of a transient air amount, fluctuations in the air-fuel ratio can be suppressed to a greater degree.

Further, for example, when the types of demanded engine performance that are currently being given priority are the running performance and the fuel consumption performance, a temporary adjustment may be made to a value of the demanded air-fuel ratio. Specifically, if a demanded controlled variable in which a change that exceeds a predetermined threshold value has occurred is the demanded air-fuel ratio, a rate of change in the demanded air-fuel ratio may be lessened by means such as a low-pass filter. In this case, although a temporary divergence arises between the original demanded air-fuel ratio and the realized value of the air-fuel ratio, since a value that has been demanded is realized with respect to the torque and the efficiency, realization of both the running performance, with which the torque is associated, and the fuel consumption performance, with which the efficiency is associated, are ensured.

On the other hand, for example, when the types of demanded engine performance that are currently being given priority are the running performance and the exhaust gas performance, an adjustment may be made to a demanded value of both thereof. In this case, if a demanded controlled variable in which a change that exceeds a predetermined threshold value has occurred is the demanded air-fuel ratio, the ignition timing is automatically changed so as to suppress fluctuations in the torque that accompany a change in the demanded air-fuel ratio. However, since a value that has been demanded is thereby realized with respect to the torque and the air-fuel ratio, realization of both the running performance, with which the torque is associated, and the exhaust gas performance, with which the air-fuel ratio is associated, are ensured.

As described above, according to the present control apparatus, even in a case where any one of the demanded torque, the demanded efficiency, and the demanded air-fuel ratio that are demanded values of controlled variables changes at a fast rate that exceeds a response speed of the related controlled variable with respect to an operation of an actuator, realization of at least a performance that is demanded with highest priority among the performances demanded of an internal combustion engine can be ensured.

DESCRIPTION OF EMBODIMENTS

An embodiment of the present invention is described hereunder with reference to the drawings.

An internal combustion engine (hereinafter, referred to as "engine") which is a control object in the present embodiment is a spark-ignition type, four-cycle reciprocating engine. A three-way catalyst for purifying exhaust gas is provided in an exhaust passage of the engine. The control apparatus controls the operation of the engine by operating actuators included in the engine. The actuators which can be operated by the control apparatus include an ignition apparatus, a throttle, a fuel injection apparatus, a variable valve timing mechanism, an EGR apparatus and the like. However, in the present embodiment, the control apparatus operates the throttle, the ignition apparatus and the fuel injection apparatus, and controls the operation of the engine by operating these three actuators.

The control apparatus of the present embodiment uses torque, efficiency, and an air-fuel ratio as controlled variables of the engine. In a stricter sense, as used herein the term "torque" refers to an indicated torque generated by the engine, and the term "air-fuel ratio" refers to the air-fuel ratio of an air-fuel mixture that is provided for combustion. In the present description, the term "efficiency" refers to the ratio of the torque which is actually outputted with respect to the torque (potential torque) which the engine can potentially output. The maximum value of the efficiency is 1, and at such time the potential torque which the engine can output is actually outputted intact. When the efficiency is lower than 1, the actually outputted torque is less than the potential torque that can be outputted from the engine, and the surplus is mainly outputted from the engine in the form of heat. The control apparatus of the present embodiment performs air amount control, ignition timing control, and fuel injection amount control based on demanded values of these three kinds of controlled variables. Torque is the fundamental controlled variable among the three kinds of controlled variables, and normally control of the engine is performed by giving priority to realization of the demanded torque. Note that, an actuator that is used for air amount control is the throttle, an actuator that is used for ignition timing control is the ignition apparatus, and an actuator that is used for fuel injection amount control is the fuel injection apparatus.

Figure 1:
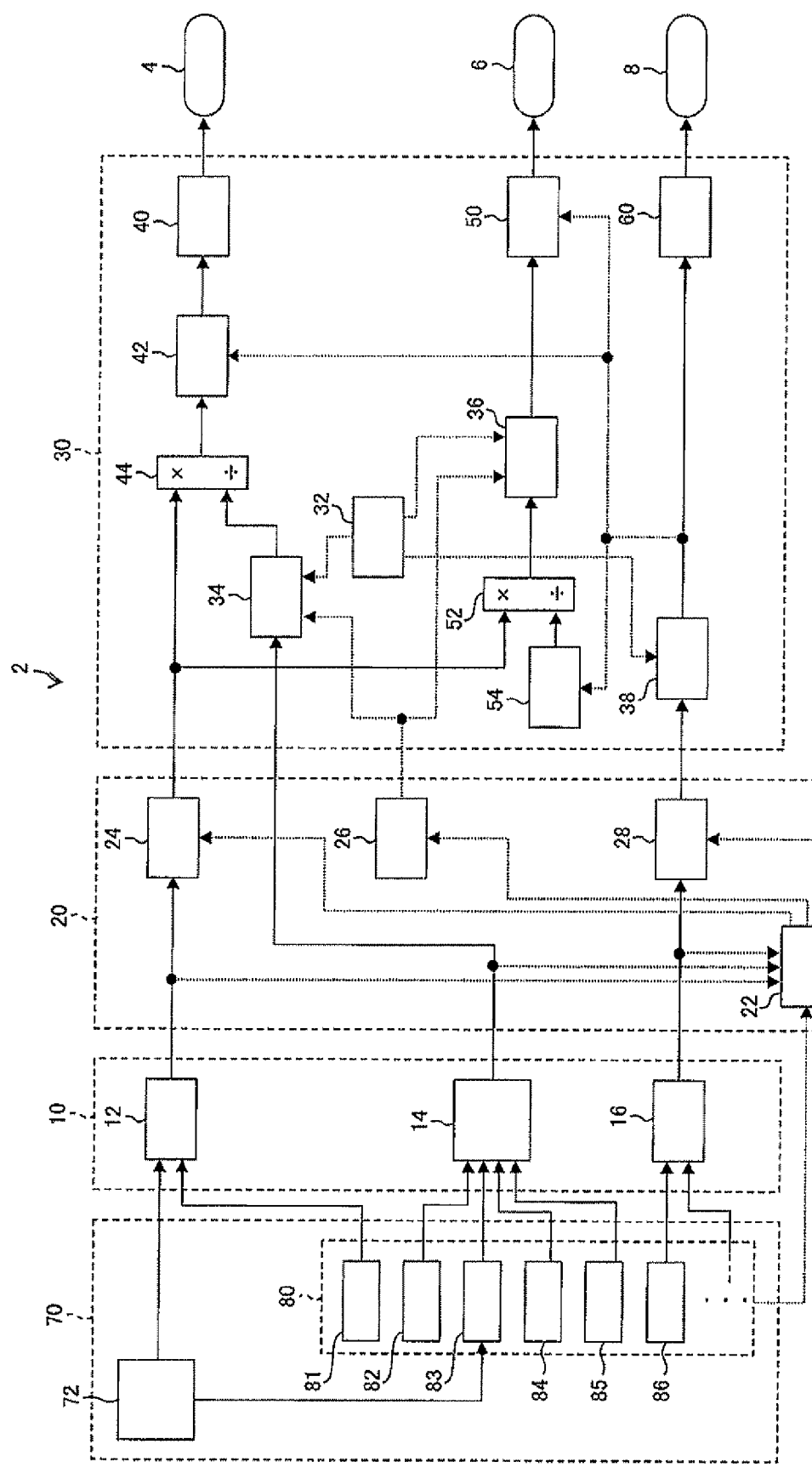
FIG. 1 is a block diagram that illustrates the configuration of a control apparatus of an embodiment of the present invention.

A control apparatus 2 shown in the block diagram of FIG. 1 illustrates a configuration of the control apparatus of the present embodiment. The respective elements constituting the control apparatus 2 in FIG. 1 are illustrated as the result of especially illustrating in the drawing only elements relating to air amount control, ignition timing control and fuel injection amount control performed by operation of three kinds of actuators, that is, a throttle 4, an ignition apparatus 6, and a fuel injection apparatus 8, among various functional elements of the control apparatus 2. Accordingly, the illustration shown in FIG. 1 does not mean that the control apparatus 2 includes only these elements. Each of the elements may be respectively implemented by dedicated hardware, or may share hardware and may be virtually implemented by software.

Figure 2:
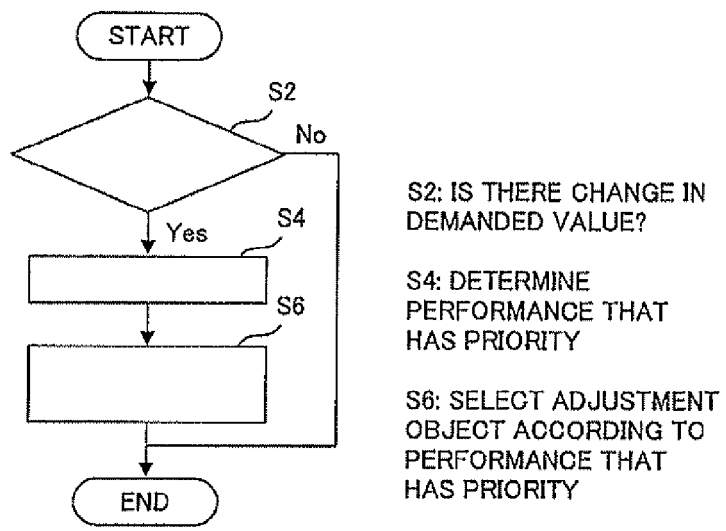
FIG. 2 is a flowchart that illustrates processing performed by the control apparatus of the embodiment of the present invention.

The configuration of the control apparatus 2 illustrated in FIG. 2 is broadly divided into four units that are denoted by reference numerals 70, 10, 20, and 30. A demand generation unit 70 is positioned at the most upstream position in the signal transmitting system in the control apparatus 2. A demand mediation unit 10 is position at the next position after the demand generation unit 70, and a demand adjustment unit 20 is positioned at the next position after the demand mediation unit 10. A demand realization unit 30 is positioned after the demand adjustment unit 20, that is, at the most downstream position in the signal transmitting system. An operation signal is output from the demand realization unit 30 to each of the aforementioned actuators 4, 6, and 8. Note that, in addition to communication signals between blocks that are indicated by arrows in FIG. 1, various kinds of signals flow through the control apparatus 2. An example of such signals is a signal that includes engine information relating to an operation condition or operation state of the engine. Engine information includes the number of engine revolutions, an output value of a degree of throttle opening sensor, an output value of an air-fuel ratio sensor, the actual ignition timing at the current time, the cooling water temperature, and the valve timing of an intake valve and an exhaust valve.

Hereunder, the configuration of each of the units 70, 10, 20, and 30 constituting the control apparatus 2 and the processing performed in the units 70, 10, 20, and 30 are described.

First, the demand generation unit 70 is described. The demand generation unit 70 includes a torque demand unit 72. The torque demand unit 72 converts a demand relating to the torque that is the fundamental controlled variable into numerical value form and outputs the obtained value. The demanded torque that is outputted from the torque demand unit 72 includes two kinds of signals. One kind is a signal of demanded torque that is determined in accordance with an accelerator pedal operation performed by a driver that is a signal of a comparatively low frequency. The other kind of signal is a signal of demanded torque for driving control of the vehicle that is a signal of a comparatively high frequency. As used herein, the term "driving control of the vehicle" includes, in addition to skid prevention control, vibration suppression control for the purpose of suppressing spring vibrations of the vehicle by means of torque vibrations.

The demand generation unit 70 further includes a performance demand unit 80. The performance demand unit 80 determines a demand relating to a controlled variable based on performances demanded of the engine, and converts the demand into numerical value form and outputs the obtained value. The performances demanded of the engine include running performance, exhaust gas performance, and fuel consumption performance. In order to accurately reflect these demanded performances in the controlled variables, the performance demand unit 80 includes a plurality of demanded output elements 81 to 86. The respective demanded output elements 81 to 86 are associated with any one of the functions that are demanded of the engine. For example, the demanded output element 81 is an element that is related to the running performance, and outputs a demanded torque for idle rotation control. The demanded output element 82 is an element that is related to fuel consumption, and outputs a demanded efficiency for improving fuel consumption. The demanded output element 83 is an element that is related to running performance, and when the torque demand unit 72 outputs a demanded torque of a high frequency, the demanded output element 83 operates in response thereto to output a demanded efficiency for supporting realization of the high frequency torque. The demanded output elements 84, 85, and 86 relate to exhaust gas performance. The demanded output element 84 outputs a demanded efficiency for warming up a catalyst. The demanded output element 85 outputs a demanded efficiency for suppressing catalyst deterioration. The demanded output element 86 outputs a demanded air-fuel ratio for restoring the purification rate of the catalyst. In addition to these demanded output elements, the performance demand unit 80 also includes a plurality of demanded output elements that are not shown in the drawings, and any one of a demanded torque, a demanded efficiency, and a demanded air-fuel ratio are outputted by the unshown plurality of demanded output elements.

Next, the demand mediation unit 10 will be described. As described above, a plurality of demands relating to the respective controlled variables are outputted from the demand generation unit 70. However, since a plurality of demands that are outputted with respect to a single controlled variable can not all be realized simultaneously, processing is necessary that performs a mediation process with respect to the demands for each controlled variable. As used herein, the term "mediation" refers to a computation process for obtaining a single numerical value from a plurality of numerical values, such as, for example, selecting the maximum value selection, selecting the minimum value, averaging, or superimposing, and a configuration can be adopted in which the mediation process appropriately combines a plurality of kinds of computation processes. To execute such kind of mediation for each controlled variable, the demand mediation unit 10 includes three mediation elements 12, 14, and 16. The mediation element 12 collects various demanded torques that the demand generation unit 70 generated and performs a mediation process thereon, and outputs the mediation result as a final demanded torque. The mediation element 14 collects various demanded efficiencies that the demand generation unit 70 generated and performs a mediation process thereon, and outputs the mediation result as a final demanded efficiency. The mediation element 16 collects various demanded air-fuel ratios that the demand generation unit 70 generated and performs a mediation process thereon, and outputs the mediation result as a final demanded air-fuel ratio.

The three kinds of demanded controlled variables that are outputted from the demand mediation unit 10, that is, the demanded torque, the demanded efficiency, and the demanded air-fuel ratio, are inputted to the demand realization unit 30 via the demand adjustment unit 20. The demand adjustment unit 20 is a main unit of the control apparatus 2 that is most related to task and object of the present invention in the present embodiment. Therefore, here, the demand realization unit 30 will be described first, and after the overall configuration of the control apparatus 2 other than the demand adjustment unit 20 has been explained, the demand adjustment unit 20 will be described in detail.

The demand realization unit 30 includes a plurality of statistical models or physical models that are represented by a map or function, that are inverse models of the engine. Based on three kinds of demanded controlled variables that are inputted via the demand adjustment unit 20, the demand realization unit 30 calculates manipulated variables of the respective actuators 4, 6, and 8 that are necessary to realize the three kinds of demanded controlled variables. The manipulated variables calculated by the demand realization unit 30 are a degree of throttle opening for operating the throttle 4, an ignition timing for operating the ignition apparatus 6, and a fuel injection amount for operating the fuel injection apparatus 8. To calculate these manipulated variables, the demand realization unit 30 includes a plurality of computing elements 32, 34, 36, 38, 40, 42, 44, 50, 52, 54, and 56.

First, calculation of the degree of throttle opening by the demand realization unit 30 will be described. The demand realization unit 30 includes a demanded potential torque calculation unit 44, a target air amount calculation unit 42, and a degree of throttle opening calculation unit 40 as computing elements for calculating the degree of throttle opening. The demanded potential torque calculation unit 44 calculates a demanded potential torque by dividing an inputted demanded torque by the demanded efficiency. If the demanded efficiency is a value that is less than 1, the demanded potential torque becomes larger than the demanded torque. This means that a requirement with respect to air amount control by the throttle 4 is to enable the potential output of torque that is greater than the demanded torque. However, with respect to the demanded efficiency, a value that has passed through an upper/lower limit guard unit 34 is inputted to the demanded potential torque calculation unit 44. The upper/lower limit guard unit 34 is described later. The demanded potential torque that has been calculated by the demanded potential torque calculation unit 44 is inputted to the target air amount calculation unit 42.

The target air amount calculation unit 42 converts the demanded potential torque into a target air amount using a torque-air amount conversion map. The term "air amount" used here refers to the amount of air taken into a cylinder (a charging efficiency or a load factor, which are non-dimensional equivalents of the air amount, can also be used instead of the air amount). The torque-air amount conversion map is prepared on the presumption that the ignition timing is an optimal ignition timing (an ignition timing that is located further on a retarded side among an MBT and a trace knock ignition timing), and is a map in which the torque and the air amount are associated using various engine status amounts, such as the number of engine revolutions and the air-fuel ratio as keys. This map is created on the basis of data obtained by testing the engine. Actual values or target values of the engine status amounts are used to search the torque-air amount conversion map. With regard to the air-fuel ratio, a demanded air-fuel ratio is used to search the map. Accordingly, at the target air amount calculation unit 42, the air amount of that is required to realize the demanded potential torque at the demanded air-fuel ratio is calculated as the target air amount. Note that the demanded air-fuel ratio that is used in this case is a demanded air-fuel ratio that passed through an upper/lower limit guard unit 38 that is described later, and is not exactly the same ratio as the demanded air-fuel ratio that was inputted to the demand realization unit 30. The target air amount calculated by the target air amount calculation unit 42 is inputted to the degree of throttle opening calculation unit 40.

The degree of throttle opening calculation unit 40 converts the target air amount into a degree of throttle opening using an inverse model of an air model. The air model is a physical model which is the result of modeling the response characteristic of the air amount with respect to the operation of the throttle 4, and hence the degree of throttle opening required to achieve the target air amount can be back-calculated using the inverse model of the air model. The control apparatus 2 operates the throttle 4 in accordance with the degree of throttle opening calculated by the degree of throttle opening calculation unit 40.

Next, calculation of the ignition timing at the demand realization unit 30 is described. The demand realization unit 30 includes an estimated potential torque calculation unit 54, an instructed efficiency calculation unit 52, and an ignition timing calculation unit 50 as computing elements for computing the ignition timing. The estimated potential torque calculation unit 54 calculates the estimated potential torque based on the actual degree of throttle opening that is realized by the above described throttle operation. The term "estimated potential torque" as used in the present description refers to torque that can be outputted in a case where ignition timing is set to the optimal ignition timing based on the current degree of throttle opening and demanded air-fuel ratio, that is, an estimated value of the torque that the engine can potentially output. The estimated potential torque calculation unit 54 first converts the degree of throttle opening to an estimated air amount using a forward model of the aforementioned air model. The estimated air amount is an estimated value of an air amount that is actually realized by the current degree of throttle opening. Next, estimated potential torque calculation unit 54 converts the estimated air amount into an estimated potential torque using the torque-air amount conversion map. A search of the torque-air amount conversion map is conducted by using a value of a demanded air-fuel ratio that has passed through the upper/lower limit guard unit 38, described later, as a search key. The estimated potential torque calculated by the estimated potential torque calculation unit 54 is inputted to the instructed efficiency calculation unit 52.

The instructed efficiency calculation unit 52 calculates a ratio between the demanded torque that was inputted to the demand realization unit 30 and the estimated potential torque. The calculated ratio represents the efficiency for realizing the demanded torque, and is used as an instructed efficiency for ignition timing control. The instructed efficiency for ignition timing control that was calculated by the instructed efficiency calculation unit 52 passes through an upper/lower limit guard unit 36, described later, and thereafter is inputted to the ignition timing calculation unit 50.

The ignition timing calculation unit 50 calculates the ignition timing based on the inputted instructed efficiency for ignition timing control. Specifically, the ignition timing calculation unit 50 calculates the optimal ignition timing based on engine status amounts, such as the number of engine revolutions, the demanded torque, and the air-fuel ratio, and also calculates a retardation amount with respect to the optimal ignition timing based on the inputted instructed efficiency for ignition timing control. If the instructed efficiency is 1, the retardation amount is set as zero, and the retardation amount is increased as the instructed efficiency decreases from 1. Subsequently, the ignition timing calculation unit 50 calculates a value obtained by adding the retardation amount to the optimal ignition timing as a final ignition timing. A map in which an optimal ignition timing and various engine status amounts are associated can be used to calculate the optimal ignition timing. To calculate the retardation amount, a map in which a retardation amount, efficiency, and various engine status amounts are associated can be used. To search these maps, a value of a demanded air-fuel ratio that has passed through the upper/lower limit guard unit 38 that is described later is used as a search key. Operation of the ignition apparatus 6 by the control apparatus 2 is performed in accordance with the ignition timing calculated by the ignition timing calculation unit 50.

Next, calculation of a fuel injection amount by the demand realization unit 30 is described. The demand realization unit 30 includes a fuel injection amount calculation unit 60 as a computing element for computing a fuel injection amount. When a timing for calculation of a fuel injection amount for injection into a certain cylinder is reached, the fuel injection amount calculation unit 60 calculates a fuel injection amount based on a demanded air-fuel ratio that has passed through the upper/lower limit guard unit 38, described later, and a predicted air amount at an intake valve closing timing of the relevant cylinder. Operation of the fuel injection apparatus 8 by the control apparatus 2 is performed in accordance with the fuel injection amount calculated by the fuel injection amount calculation unit 60.

Lastly, an adjustment function that the demand realization unit 30 is described. An adjustment that is performed by the demand realization unit 30 differs to an adjustment performed by the demand adjustment unit 20 that is described later. The adjustment performed by the demand realization unit 30 is a size adjustment among demanded controlled variables in a steady state. The demand generation unit 70 generates various demands without taking into account a combustion limit condition of the engine, and the demand mediation unit 10 also performs mediation without taking into account the combustion limit condition. Consequently, depending on the relationship between the sizes of the respective demanded controlled variables that are finally decided, there is a possibility that it will not be possible to operate the engine appropriately. Therefore, the demand realization unit 30 adjusts a value of a demanded controlled variable for which the order of priority is low based on a demanded controlled variable for which the order of priority is high so as to enable appropriate operation of the engine. More specifically, the demanded torque is selected as the demanded controlled variable with the highest priority, and the demanded controlled variable that should be given the next highest priority is selected from the demanded efficiency and the demanded air-fuel ratio. Further, based on the value of either one of the demanded efficiency and the demanded air-fuel ratio that was selected, the demand realization unit 30 adjusts the value of the other demanded controlled variable that was not selected. Means for implementing this adjustment are the aforementioned various upper/lower limit guard units 34, 36, and 38 and a combustion limit guard value calculation unit 32.

The upper/lower limit guard unit 34 limits a value of a demanded efficiency to a range that is defined by an upper limit guard value and a lower limit guard value. The upper/lower limit guard unit 36 limits a value of an instructed efficiency to a range that is defined by an upper limit guard value and a lower limit guard value. The respective guard values of the upper/lower limit guard unit 36 are set to the same values as the respective guard values of the upper/lower limit guard unit 34. Further, the upper/lower limit guard unit 38 limits a value of a demanded air-fuel ratio to a range that is defined by an upper limit guard value and a lower limit guard value. The respective guard values used by the upper/lower limit guard units 34, 36, and 38 are all variable, and the values thereof are calculated by the combustion limit guard value calculation unit 32.

When realization of the demanded air-fuel ratio is the operation mode that is given priority, the combustion limit guard value calculation unit 32 calculates an upper limit value and a lower limit value of an efficiency at which normal combustion can be secured at the demanded air-fuel ratio using various kinds of engine information, and sets those values as the respective guard values of the upper/lower limit guard unit 34 and the upper/lower limit guard unit 36. In this case, the respective guard values of the upper/lower limit guard unit 38 are set to an uppermost limit value and a lowermost limit value of an air-fuel ratio at which normal combustion can be secured. On the other hand, when realization of the demanded efficiency is the operation mode that is given priority, the combustion limit guard value calculation unit 32 calculates an upper limit value and a lower limit value of an air-fuel ratio at which normal combustion can be secured at the demanded efficiency using various kinds of engine information, and sets those values as the respective guard values of the upper/lower limit guard unit 38. In this case, the respective guard values of the upper/lower limit guard unit 34 and the upper/lower limit guard unit 36 are set to an uppermost limit value and a lowermost limit value of an efficiency at which normal combustion can be secured. The demanded efficiency, instructed efficiency, and demanded air-fuel ratio that have been subjected to size adjustment in this manner are used for calculating the respective manipulated variables at the demand realization unit 30.

Next, the demand adjustment unit 20 that is a main unit of the control apparatus 2 of the present embodiment is described in detail. The demand adjustment unit 20 fulfills the role of ensuring that at least a performance with the highest priority among the performances demanded of the engine is realized, even in a case where any one of a final demanded torque, a demanded efficiency, and a demanded air-fuel ratio that were decided by the demand mediation unit 10 changes at a fast rate that exceeds a response speed of an actuator. The term "actuator" used here refers to the throttle 4 that has the closest relationship with torque that is the principal controlled variable. The processing that is performed at the demand adjustment unit 20 is a temporary adjustment that is applied to a value of any one of the demanded torque, the demanded efficiency and instructed efficiency, and the demanded air-fuel ratio. This adjustment is made in accordance with the type of engine performance that is currently being given priority. To perform such processing, the demand adjustment unit 20 includes an adjustment determination unit 22, a demanded torque adjustment unit 24, an efficiency adjustment unit 26, and a demanded air-fuel ratio adjustment unit 28.

The adjustment determination unit 22 has a function that determines whether or not the necessity to make an adjustment has arisen, and when it is determined that the necessity has arisen, selects an object to adjust in accordance with the engine performance that is given priority. The function of the adjustment determination unit 22 can be represented by the flowchart shown in FIG. 2. In an initial step S2, the adjustment determination unit 22 fetches the values of the final demanded torque, the demanded efficiency and the demanded air-fuel ratio that were decided by the demand mediation unit 10, and determines whether or not a change amount of any of those values exceeds a corresponding threshold value. A threshold value that is used for the determination is set on the basis of a limit response speed of an air amount with respect to an operation of the throttle 4. That is, the adjustment determination unit 22 determines whether or not a sudden change to which a sufficient response could not be achieved by air amount control by means of an operation of the throttle 4 arises with respect to any of the demanded controlled variables. If it is predicted that such a change amount exceeds a threshold value with respect to any of the demanded controlled variables, or if it is detected that such a change amount has actually exceeded a threshold value, the adjustment determination unit 22 executes the processing in step S4 and step S6. In step S4, the adjustment determination unit 22 determines which demanded engine performance is currently being given priority based on information acquired from the performance demand unit 80. Next, in step S6, the adjustment determination unit 22 selects an object or objects that should be adjusted in accordance with the type of demanded engine performance that is given priority, and outputs an instruction to an element that is associated with a selected adjustment object. Specifically, if the demanded torque is included in the selected adjustment objects, the adjustment determination unit 22 outputs an instruction to temporarily adjust the value of the demanded torque to the demanded torque adjustment unit 24. If the demanded efficiency and instructed efficiency are included in the selected adjustment objects, the adjustment determination unit 22 outputs an instruction to temporarily adjust the value of the demanded efficiency and instructed efficiency to the efficiency adjustment unit 26. Further, if the demanded air-fuel ratio is included in the selected adjustment objects, the adjustment determination unit 22 outputs an instruction to temporarily adjust the value of the demanded air-fuel ratio to the demanded air-fuel ratio adjustment unit 28.

Upon receiving an instruction from the adjustment determination unit 22, the demanded torque adjustment unit 24 temporarily adjusts the value of the demanded torque that was outputted from the demand mediation unit 10, and inputs the adjusted demanded torque to the demand realization unit 30. Regarding the method of adjusting the value of the demanded torque, the optimal method is appropriately selected from among previously registered adjustment methods in accordance with the type of the demanded controlled variable for which a change amount exceeded a threshold value or in accordance with the type of demanded engine performance that is being given priority.

Upon receiving an instruction from the adjustment determination unit 22, the efficiency adjustment unit 26 sets the respective guard values of the aforementioned upper/lower limit guard unit 34 and upper/lower limit guard unit 36. In this case, the respective values of the demanded efficiency and instructed efficiency are limited to within the range that is defined by the upper limit guard value and the lower limit guard value. If the upper limit guard value and the lower limit guard value are the same value, that value becomes the value of the demanded efficiency and the instructed efficiency after limitation, respectively. The upper limit guard value and the lower limit guard value that are set by the efficiency adjustment unit 26 are given priority over the upper limit guard value and the lower limit guard value that are set by the combustion limit guard value calculation unit 32. Regarding the method of setting each guard value, the optimal method is appropriately selected from among previously registered setting methods in accordance with the type of the demanded controlled variable for which a change amount exceeded a threshold value or in accordance with the type of demanded engine performance that is being given priority.

Upon receiving an instruction from the adjustment determination unit 22, the demanded air-fuel ratio adjustment unit 28 temporarily adjusts the value of the demanded air-fuel ratio that was outputted from the demand mediation unit 10, and inputs the adjusted demanded air-fuel ratio to the demand realization unit 30. Regarding the method of adjusting the value of the demanded air-fuel ratio, the optimal method is appropriately selected from among previously registered adjustment methods in accordance with the type of the demanded controlled variable for which a change amount exceeded a threshold value or in accordance with the type of demanded engine performance that is being given priority.

Figure 3:
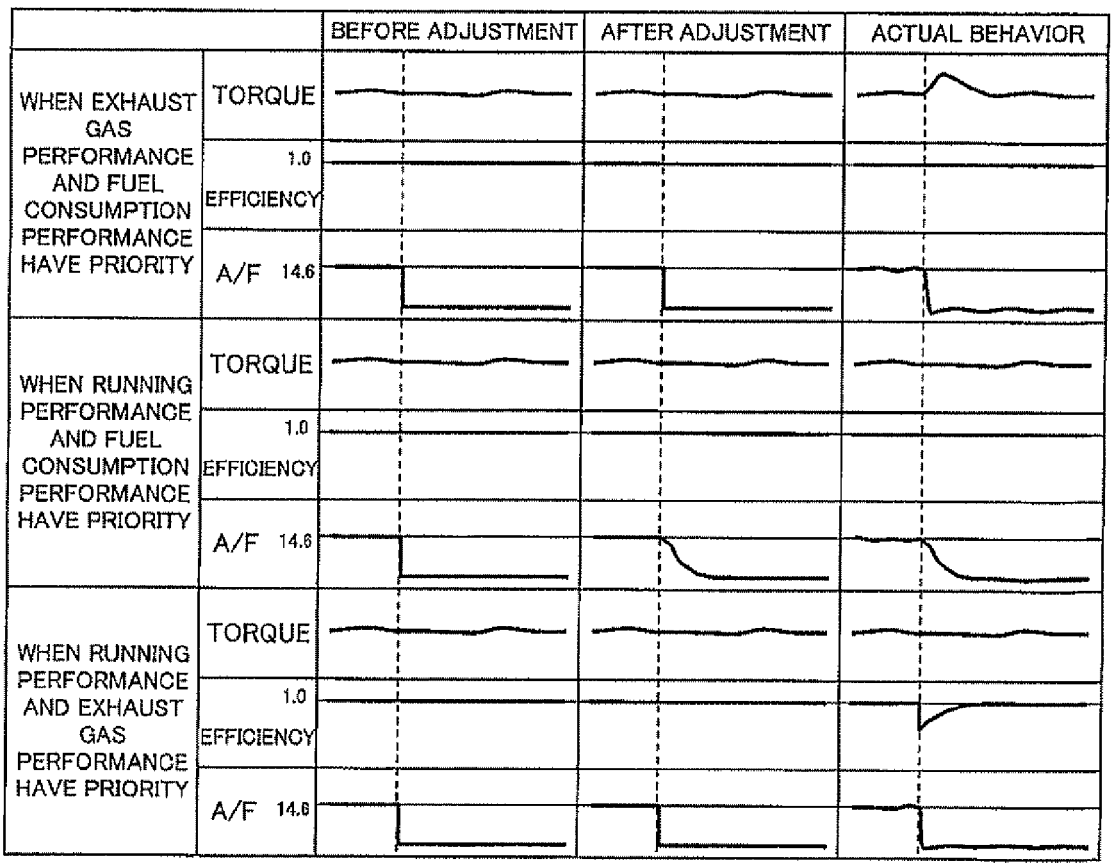
FIG. 3 is a time chart that illustrates specific examples of processing performed by the control apparatus of the embodiment of the present invention.

Next, the contents of processing performed by the demand adjustment unit 20 and the effects thereof are described using specific examples. In this case, an example is described in which, at a certain timing, the demanded air-fuel ratio changes in a stepwise manner from a stoichiometric ratio to a ratio on the rich side of the stoichiometric ratio. Further, as a premise, it is assumed that the initial value of the demanded efficiency is set to 1. FIG. 3 illustrates a time chart in which, for three cases, namely, a case when exhaust gas performance and fuel consumption performance are given priority (case 1), a case when running performance and fuel consumption performance are given priority (case 2), and a case when running performance and exhaust gas performance are given priority (case 3), the respective temporal changes in a pre-adjustment demanded value, a post-adjustment demanded value, and an actual realized value of the three kinds of controlled variables are shown, respectively.

As described above, the target air amount calculation unit 42 calculates an air amount that is necessary to realize the demanded torque at the demanded air-fuel ratio as a target air amount. Therefore, in a case where the demanded air-fuel ratio became richer in a stepwise manner as in the present example, the target air amount also changes in a stepwise manner in conformity therewith. Further, the degree of throttle opening is controlled in conformity with the change in the target air amount. The action of the throttle 4 at this time is an action to cancel out an increase in the torque accompanying enriching of the air-fuel ratio by decreasing the air amount. However, there is a delay in the response of the air amount with respect to the action of the throttle 4, and a decrease in the actual air amount is delayed relative to the target air amount. On the other hand, since the fuel injection amount is determined based on the actual air amount and the demanded air-fuel ratio, the fuel injection amount temporarily increases significantly due to the delay in the decrease of the air amount.

In case 1, the demanded efficiency and instructed efficiency are selected as the adjustment object, and a temporary adjustment is made to their respective values. Specifically, if a sudden change in the demanded air-fuel ratio is predicted, the respective guard values of the upper/lower limit guard unit 34 and the upper/lower limit guard unit 36 are changed to 1 by the efficiency adjustment unit 26, and the demanded efficiency and instructed efficiency are both fixed to 1. As a result of the instructed efficiency being fixed to 1, the ignition timing is maintained at the optimal ignition timing. Consequently, the influence of the fuel injection amount being temporarily increased significantly is reflected directly in the torque, and the torque that is actually realized temporarily increases to an amount that is greater than the demanded torque. However, since the ignition timing is maintained at the optimal ignition timing, the efficiency that is actually realized is also maintained at 1 and realization of the desired fuel consumption performance is ensured. Further, since the air-fuel ratio that is actually realized also changes in accordance with the demanded air-fuel ratio, realization of the desired exhaust gas performance is also ensured.

In case 2, the demanded air-fuel ratio is selected as the adjustment object, and a temporary adjustment is made to the value thereof. Specifically, if a sudden change in the demanded air-fuel ratio is predicted, lessening of the rate of change of the demanded air-fuel ratio is performed by the demanded air-fuel ratio adjustment unit 28. A low-pass filter can be used as means therefor. If a low-pass filter is used, a time constant thereof is set so that a rate of change in the demanded air-fuel ratio stays within a range of a limit response speed of torque with respect to an operation of the throttle 4. In addition, a moderation process can also be used as another means. Weighted averaging can be mentioned as one example of a moderation process. Alternatively, guard processing may be executed with respect to the rate of change in the demanded air-fuel ratio so as to lessen the rate of change thereof. By lessening the rate of change in the demanded air-fuel ratio by any of the aforementioned means, although a temporary divergence arises between the original demanded air-fuel ratio and the realized value of the air-fuel ratio, a delay in the actual air amount with respect to the target air amount disappears and a temporary increase in the fuel injection amount accompanying a delay in a decrease of the air amount is also suppressed. As a result, it is possible to cause the engine to generate torque in accordance with the demanded torque, and realization of the desired running performance is ensured. Further, in this case, since a difference between the demanded torque and the estimated potential torque does not arise, the ignition timing is maintained at the optimal ignition timing and realization of the desired fuel consumption performance is also ensured.

On the other hand, in case 3, an adjustment by the demand adjustment unit 20 is not made to any of the demanded torque, the demanded efficiency and instructed efficiency, and the demanded air-fuel ratio. This is because, according to the demand realization unit 30, the demanded torque can also be realized while realizing the demanded air-fuel ratio by automatic adjustment of the efficiency. More specifically, in a case where the demanded air-fuel ratio became richer in a stepwise manner as in this example, the target air amount also decreases in a stepwise manner, and the throttle 4 is operated so as to realize such a change in the target air amount. However, since there is a delay in the response of the air amount with respect to an action of the throttle 4, an estimated air amount that is calculated based on the current degree of throttle opening using an air model decreases in a delayed manner relative to the target air amount. Consequently, the estimated potential torque that is calculated based on the estimated air amount increases temporarily to a value that is greater than the demanded torque, and during that time, the instructed efficiency that is a ratio between the demanded torque and the estimated potential torque is a value that is less than 1. As a result, it is possible to retard the ignition timing relative to the optimal ignition timing, suppress a temporary increase in torque that accompanies a delay in the decrease of the air amount, and cause the engine to generate torque in accordance with the demanded torque. That is, realization of the desired running performance is ensured. Further, since the air-fuel ratio that is actually realized also changes in accordance with the demanded air-fuel ratio, realization of the desired exhaust gas performance is also ensured.

As will be understood from the above three specific examples, according to the control apparatus 2 of the present embodiment, even when the demanded air-fuel ratio changes at a fast rate that exceeds a limit response speed of torque with respect to an action of the throttle 4, it is possible to ensure the realization of a performance that should be given priority among the performances demanded of the engine.

However, processing that the demand adjustment unit 20 can perform in the control apparatus 2 of the present embodiment is not limited to the three specific examples described above. For example, in a case where a change amount of the demanded air-fuel ratio exceeds a predetermined threshold value, if the types of demanded engine performances that are currently being given priority are exhaust gas performance and fuel consumption performance, processing as shown in the time chart in FIG. 4 can also be performed. In the case of this example, if a sudden change in the demanded air-fuel ratio is predicted, similarly to case 1 in the foregoing example, the demanded efficiency and instructed efficiency are each fixed to 1. In addition, in this example, a change in torque that arises accompanying a change in the demanded air-fuel ratio is predicted by means of the adjustment determination unit 22, and the predicted change in torque is caused to be generated in the demanded torque by means of the demanded torque adjustment unit 24.

Figures 4, 5:
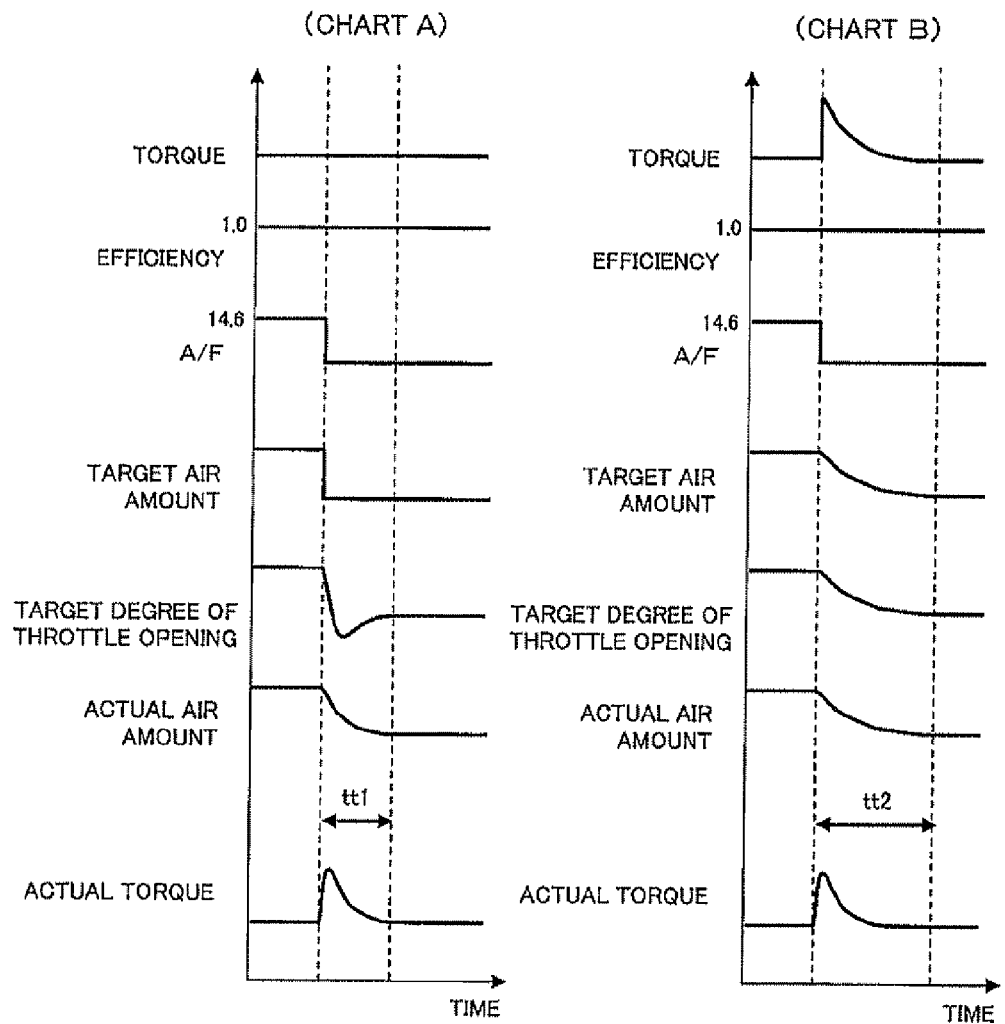
FIG. 4 is a time chart that illustrates a specific example of processing performed by the control apparatus of the embodiment of the present invention.
FIG. 5 is a time chart for describing the effect of the specific example illustrated in FIG. 4.

FIG. 5 illustrates a comparison of the effects of this processing with the effects of the processing in the above described case 1. In FIG. 5, with respect to each of case 1 of the foregoing example and the present example, a post-adjustment demanded value of the three kinds of controlled variables, a target air amount, a target degree of throttle opening, an actual air amount, and the respective temporal changes in the actual torque are shown in time charts. A chart A in FIG. 5 corresponds to case 1 of the foregoing example and chart B corresponds to the present example. According to the present example, when the demanded air-fuel ratio was enriched in a stepwise manner, first, the torque is calculated based on the target air amount at that time point and the enriched demanded air-fuel ratio, and the demanded torque is increased in a stepwise manner up to that torque. Thereafter, the demanded torque is gradually decreased to the value thereof immediately prior to being increased in a stepwise manner. By changing the demanded torque in this way, the target air amount gradually decreases. Thus, an abrupt operation of the throttle 4 is suppressed, and a convergence period of the actual air amount (denoted by tt2 in FIG. 5) becomes longer than a convergence period of the actual air amount (denoted by tt1 in FIG. 5) in the case shown in chart A. As a result, although a period until the increased actual torque converges to the demanded torque also increases, it is possible to suppress fluctuations in the air-fuel ratio by lessening the rate of fluctuation of a transient air amount. That is, by the demand adjustment unit 20 performing the processing as described in the present example, it is possible to more reliably ensure realization of the desired exhaust gas performance.

Figure 6:
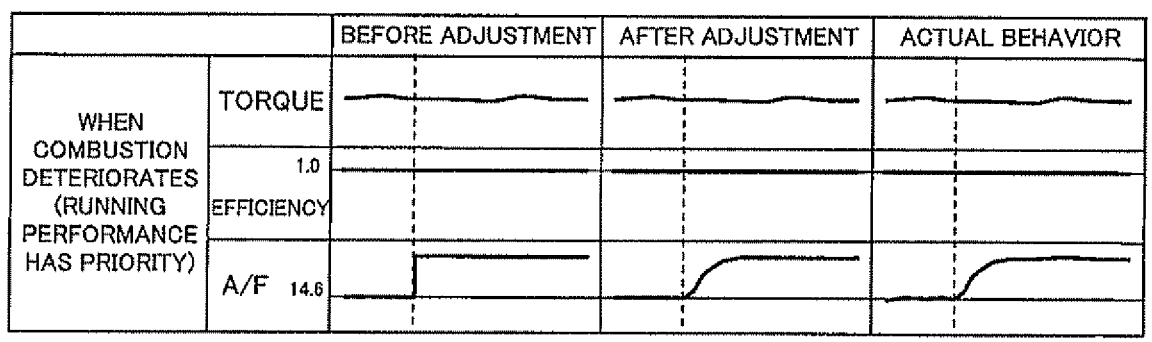
FIG. 6 is a time chart that illustrates a specific example of processing performed by the control apparatus of the embodiment of the present invention.

Further, although a case where the demanded air-fuel ratio changes in a stepwise manner from the stoichiometric ratio to the rich side is described in the above example, the demand adjustment unit 20 can also correspond to a case where the demanded air-fuel ratio changes in a stepwise manner from the stoichiometric ratio to the lean side. Although such a change in the demanded air-fuel ratio is based on a demand with respect to exhaust gas performance, if it is determined that the number of engine revolutions is decreasing, if it is determined that combustion is deteriorating, or if it is determined that a heavy fuel is being used, running performance is given priority over exhaust gas performance. In that case, as illustrated in a time chart shown in FIG. 6, when a stepwise change to the lean side of the demanded air-fuel ratio is predicted, lessening of the rate of change in the demanded air-fuel ratio is performed by means such as a low-pass filter. Consequently, although a temporary divergence arises between the original demanded air-fuel ratio and the realized value of the air-fuel ratio, a delay in the actual air amount with respect to the target air amount disappears and a temporary deficiency in the fuel injection amount that accompanies a delay in the increase of the air amount is also suppressed. As a result, it is possible to cause the engine to generate torque in accordance with the demanded torque, and realization of the desired running performance is ensured.

An embodiment of the present invention is described above. However, the present invention is not limited to the above described embodiment, and various modifications can be made without departing from the spirit and scope of the present invention. For example, although a throttle is used as the actuator for air amount control according to the above described embodiment an intake valve with a variable lift amount or a variable working angle can also be used.

DESCRIPTION OF REFERENCE CHARACTERS 2 control apparatus
4 throttle
6 ignition apparatus
8 fuel injection apparatus
10 demand mediation unit
12, 14, 16 mediation elements
20 demand adjustment unit
22 adjustment determination unit
24 demanded torque adjustment unit
26 efficiency adjustment unit
28 demanded air-fuel ratio adjustment unit
30 demand realization unit
32 combustion limit guard value calculation unit
34 respective guard values of the upper/lower limit guard unit
36 upper/lower limit guard unit
38 upper/lower limit guard unit
40 degree of throttle opening calculation unit
42 target air amount calculation unit
44 demanded potential torque calculation unit
50 ignition timing calculation unit
52 instructed efficiency calculation unit
54 estimated potential torque calculation unit
60 fuel injection amount calculation unit
70 demand generation unit
72 torque demand unit
80 performance demand unit
81, 82, 83, 84, 85, 86 demanded output elements

The invention claimed is:

1. An internal combustion engine control apparatus whose operations are controlled by a plurality of kinds of actuators, comprising:
  demanded torque deciding means that decides a demanded torque that the internal combustion engine generates, based on a demanded engine performance that is demanded of the internal combustion engine;
  demanded efficiency deciding means that, based on the demanded engine performance, decides a demanded efficiency that is a ratio of a torque that is actually output with respect to a torque that the internal combustion engine can potentially output;
  demanded air-fuel ratio deciding means that, based on the demanded engine performance, decides a demanded air-fuel ratio of an air-fuel mixture that is provided for combustion in the internal combustion engine;

demanded potential torque calculation means that calculates a demanded potential torque by dividing the demanded torque by the demanded efficiency;

target air amount calculation means that, based on data in which a relationship between an air amount at an optimal ignition timing and a torque is defined in association with an air-fuel ratio, calculates a target air amount for realizing the demanded potential torque at the demanded air-fuel ratio;

air amount control means that operates an actuator for air amount control in accordance with the target air amount;

estimated potential torque calculation means that calculates an estimated potential torque that is realized when the actuator for air amount control is operated in accordance with the target air amount at the demanded air-fuel ratio;

instructed efficiency calculation means that calculates a ratio of the demanded torque with respect to the estimated potential torque as an instructed efficiency;

ignition timing control means that operates an actuator for ignition timing control in accordance with the instructed efficiency;

fuel injection amount control means that operates an actuator for fuel injection amount control in accordance with the demanded air-fuel ratio; and adjustment means that, when a rate of change in the demanded air-fuel ratio exceeds a predetermined threshold value, makes a temporary adjustment to a value of any one of the demanded torque, the demanded efficiency and instructed efficiency, and the demanded air-fuel ratio in accordance with a type of the demanded engine performance that is currently being given priority, wherein, when the types of demanded engine performance that are currently being given priority are exhaust gas performance and fuel consumption performance, the adjustment means fixes the demanded efficiency and the instructed efficiency to a value of 1, respectively, and also predicts a change in torque that arises accompanying a change in the demanded air-fuel ratio and causes the predicted change in torque to be generated in the demanded torque.

2. The internal combustion engine control apparatus according to claim 1, wherein, when the types of demanded engine performance that are currently being given priority are running performance and fuel consumption performance, the adjustment means lessens a rate of change in the demanded air-fuel ratio.

3. The internal combustion engine control apparatus according to claim 1, wherein, when the types of demanded engine performance that are currently being given priority are running performance and exhaust gas performance, the adjustment means does not adjust any demanded value.

4. An internal combustion engine control apparatus whose operations are controlled by a plurality of kinds of actuators, comprising:

mediation element that decides a demanded torque that the internal combustion engine generates, based on a demanded engine performance that is demanded of the internal combustion engine;

mediation element that, based on the demanded engine performance, decides a demanded efficiency that is a ratio of a torque that is actually output with respect to a torque that the internal combustion engine can potentially output;

mediation element that, based on the demanded engine performance, decides a demanded air-fuel ratio of an air-fuel mixture that is provided for combustion in the internal combustion engine;

demanded potential torque calculation unit that calculates a demanded potential torque by dividing the demanded torque by the demanded efficiency;

target air amount calculation unit that, based on data in which a relationship between an air amount at an optimal ignition timing and a torque is defined in association with an air-fuel ratio, calculates a target air amount for realizing the demanded potential torque at the demanded air-fuel ratio;

calculation unit that calculates a manipulated variable of an actuator for air amount control in accordance with the target air amount;

estimated potential torque calculation unit that calculates an estimated potential torque that is realized when the actuator for air amount control is operated in accordance with the target air amount at the demanded air-fuel ratio;

instructed efficiency calculation unit that calculates a ratio of the demanded torque with respect to the estimated potential torque as an instructed efficiency;

calculation unit that calculates a manipulated variable of an actuator for ignition timing control in accordance with the instructed efficiency;

calculation unit that calculates a manipulated variable of an actuator for fuel injection amount control in accordance with the demanded air-fuel ratio; and demand adjustment unit that, when a rate of change in the demanded air-fuel ratio exceeds a predetermined threshold value, makes a temporary adjustment to a value of any one of the demanded torque, the demanded efficiency and instructed efficiency, and the demanded air-fuel ratio in accordance with a type of the demanded engine performance that is currently being given priority, wherein, when the types of demanded engine performance that are currently being given priority are exhaust gas performance and fuel consumption performance, the demand adjustment unit fixes the demanded efficiency and the instructed efficiency to a value of 1, respectively, and also predicts a change in torque that arises accompanying a change in the demanded air-fuel ratio and causes the predicted change in torque to be generated in the demanded torque.

* * * * *